US012445298B2

(12) United States Patent
Qiu et al.

(10) Patent No.: US 12,445,298 B2
(45) Date of Patent: Oct. 14, 2025

(54) PIPELINE-FRIENDLY SIGNATURE AND VERIFICATION METHOD, DEVICE, AND STORAGE MEDIUM

(71) Applicant: Hangzhou Hyperchain Technology Co., Ltd., Zhejiang (CN)

(72) Inventors: Weiwei Qiu, Zhejiang (CN); Wei Li, Zhejiang (CN); Kejie Zhang, Zhejiang (CN); Fanglei Huang, Zhejiang (CN); Peiyang Qiao, Zhejiang (CN)

(73) Assignee: HANGZHOU QULIAN TECHNOLOGY CO., LTD., Zhejiang (CN)

( * ) Notice: Subject to any disclaimer, the term of this patent is extended or adjusted under 35 U.S.C. 154(b) by 238 days.

(21) Appl. No.: 17/962,821

(22) Filed: Oct. 10, 2022

(65) Prior Publication Data

US 2023/0033216 A1 Feb. 2, 2023

Related U.S. Application Data

(63) Continuation-in-part of application No. PCT/CN2020/113766, filed on Sep. 7, 2020.

(30) Foreign Application Priority Data

Jun. 22, 2020 (CN) .......................... 202010574911.0

(51) Int. Cl.
*H04L 9/08* (2006.01)
*H04L 9/06* (2006.01)
*H04L 9/32* (2006.01)

(52) U.S. Cl.
CPC .......... *H04L 9/3247* (2013.01); *H04L 9/0643* (2013.01); *H04L 9/0825* (2013.01); *H04L 9/0869* (2013.01)

(58) Field of Classification Search
None
See application file for complete search history.

(56) References Cited

U.S. PATENT DOCUMENTS

| 11,804,960 B2 * | 10/2023 | Mukherjee ............ H04L 9/0869 |
| 2008/0163338 A1 * | 7/2008 | Micali ..................... G06Q 20/02 726/2 |

(Continued)

FOREIGN PATENT DOCUMENTS

| CN | 107968708 A | 4/2018 |
| CN | 108711212 A | 10/2018 |

(Continued)

*Primary Examiner* — Joshua Joo
(74) *Attorney, Agent, or Firm* — CANTOR COLBURN LLP (57) ABSTRACT

The present application provides a pipeline-friendly signature and verification method, a device and a storage medium. The method includes the following steps: generating, by the Witness node, a public-private key pair including a private key and a public key, through a basic signature algorithm, and sending the public key to other Witness nodes; selecting, by the Witness node, a random number, and sending V to a Leader node; receiving C sent by the Leader node; calculating a message digest through the basic signature algorithm and a message hash algorithm, according to the C and the public key, and then calculating ps, and sending the ps to the Leader node.

15 Claims, 5 Drawing Sheets

(56) References Cited

U.S. PATENT DOCUMENTS

| | | | | |
|---|---|---|---|---|
| 2008/0181413 A1* | 7/2008 | Yi | ........................... | H04L 9/302 |
| | | | | 380/279 |
| 2019/0288855 A1* | 9/2019 | Abt, Jr. | ................ | H04L 9/0869 |
| 2020/0252211 A1* | 8/2020 | Chen | ..................... | H04L 9/0894 |
| 2022/0182243 A1* | 6/2022 | Wang | ................. | H04L 45/7453 |
| 2022/0247572 A1* | 8/2022 | Trevethan | ............... | H04L 9/085 |
| 2023/0208626 A1* | 6/2023 | Nix | ...................... | H04L 9/3247 |
| | | | | 713/171 |

FOREIGN PATENT DOCUMENTS

| | | |
|---|---|---|
| CN | 110322246 A | 10/2019 |
| CN | 110505064 A | 11/2019 |
| CN | 110943838 A | 3/2020 |
| CN | 111221639 A | 6/2020 |
| CN | 111478772 A | 7/2020 |
| JP | H0695590 B2 | 11/1994 |
| JP | H10153956 A | 6/1998 |
| JP | 2017515252 A | 6/2017 |
| JP | 2019506074 A | 2/2019 |
| WO | 2020121265 A1 | 6/2020 |

\* cited by examiner

PIPELINE-FRIENDLY SIGNATURE AND VERIFICATION METHOD, DEVICE, AND STORAGE MEDIUM

CROSS-REFERENCE TO RELATED APPLICATION

This application is a continuation-in-part of International Patent Application No. PCT/CN2020/113766 with an international filing date of Sep. 7, 2020, designating the United States, now pending, which claims the priority of the Chinese Patent Application No. 202010574911.0 filed on Jun. 22, 2020. The contents of which are incorporated herein by reference.

FIELD

The present application relates to the field of data encryption technology, and more particularly to a pipeline-friendly signature and verification method, a device, and a storage medium.

BACKGROUND

Blockchain technology, or Blockchain is a new type of decentralized protocol that can safely store digital currency transactions or other data. The stored information cannot be forged or tampered with. Confirmation of transactions on the blockchain is completed jointly by all nodes on the blockchain, and the consistency of the confirmation is guaranteed by the consensus algorithm. A public ledger is maintained on the blockchain. The public ledger is located on the node where the block is stored, and is visible for any node thereby ensuring that the public ledge cannot be forged or tampered with. One of the fundamental differences between alliance blockchains and ordinary blockchains (existing blockchains will also have blockchains that involve privacy protection mechanisms) is the need to provide a privacy protection mechanism. Normally, this mechanism is implemented through signature encryption and verification signature in cryptography. At present, blockchain transactions are packaged into blocks to be sent to the blockchain nodes. The node unlocks the blocks and obtains the transactions in the blocks, then verifies each transaction and executes a commit process of the corresponding transaction in order. Since a submission of the existing blockchain transactions is performed in a sequential manner, when the system is busy and many transactions are generated, the speed of transaction submission often lags behind the speed of transaction generation, which reduces an efficiency of transaction processing, so the pipeline technology is adopted.

Pipeline technology refers to a parallel processing technology commonly used in computer technology. In a batch process, one process is divided into several parts according to time sequence, and then each part is processed in parallel to achieve accelerated optimization. For example, the instruction pipeline of the computer processor, the pipeline processing of the Hotstuff consensus protocol, etc. However, if a failure of a certain part requires a change in the execution process, for example, a failure of a certain step of a program causes the program to be re-executed from the beginning, then the pipeline process will be destroyed. Pipeline friendliness refers to a program feature that does not cause such damage.

Threshold signature scheme refers to a signature group composed of n members. The group has a pair of public and private keys. A combination of at least T legal and honest members in the group can sign with the group private key on behalf of the group. Anyone can use the public key of the group to perform signature verification; here T is a threshold, only T or more legal members can perform signature on behalf of the group, and any T−1 or less members in the group cannot perform signature on behalf of the group, meanwhile no member can impersonate another member to sign. The threshold signature method can realize power distribution and avoid abuse of power.

Most of the threshold signatures used in the existing blockchains are constructed by BLS and other signature algorithms that require interaction, however, BLS is based on bilinear pairing and requires a lot of calculations, which consumes a lot of CPU time on nodes and becomes a bottleneck of performance, thus restricts the further application of blockchain. For example, the company of Facebook has a blockchain product Libra which uses variant consensus algorithm of Hotstuff, while only BLS or Ed25519 batch verification can be used because the fast Ed25519 aggregation signature is not pipeline-friendly, which is only optimized from verification, the amount of network communication is not decreased, and the network burden cannot be solved. How to find a pipeline-friendly and efficient threshold signature method is a challenge for the alliance blockchain to be better used in actual production.

SUMMARY

To overcome the above technical problems, the present application provides a pipeline-friendly signature and verification method, a device and a storage medium. The signature algorithm having the linear signature verification structure is constructed as an aggregate signature, which has characteristics of the threshold signature. Being friendly to the pipeline mechanism avoids an interruption of the pipeline process due to a failure of a certain step of the agreement. The pressure of signature verification can be significantly reduced.

To solve the above problems, embodiments provided by the present application are as follows:

In accordance with an aspect of the present application, a pipeline-friendly signature method is provided, which is suitable for a Witness node. In this method, a public-private key pair including a private key and a public key, is generated by the Witness node through a basic signature algorithm, and the public key is sent by the Witness node to other Witness nodes. A random number v is selected by the Witness node, and V is determined by the Witness node according to the random number v and a generator G. The generator is a relevant parameter determined according to a type of the basic signature algorithm. Then the V is sent to a Leader node by the Witness node, and C sent by the Leader node is received by the Witness node. The C is obtained by the Leader node according to the V received by the Leader node. A message digest h is calculated by the Witness node, according to the C and the public key, through the basic signature algorithm and a message hash algorithm, and then ps is calculated by the Witness node according to the message digest and the random number; and sent by the same to the Leader node.

The Leader node is selected by more than one Witness nodes, and relevant parameters including at least a generator G are determined according to a type of the basic signature algorithm. Within a first appointment time, if the Leader node does not receive the V sent by the Witness node, it is deemed that the corresponding Witness node has given up voting, and the Leader node randomly generates the V for the corresponding Witness node; if the Leader node receives the V sent by the Witness node, it is deemed that the corresponding Witness node participates in the voting; all V is added to get the C, and the C is sent to the Witness node. Within a second appointment time, if the Leader node does not receive the ps sent by the corresponding Witness node, the corresponding Witness node is regarded as an invalid vote, and the corresponding marker bit of the bitmask Mask is marked as 0; verifying, by the Leader node, whether the received ps is correct; if the ps is incorrect, the corresponding Witness node is regarded as an invalid vote, and the corresponding marker bit of the bitmask Mask is marked as 0; if the ps is correct, the corresponding Witness node is regarded as a valid vote, and the corresponding marker bit of the bitmask Mask is marked as 1. An aggregate signature (C, s, Mask) is calculated, where s is the sum of N correct ps, and N is the number of Witness nodes having correct ps, which is used to be compared with the threshold T during a verification.

In an embodiment, the V is determined by the Witness node according to the following formula: $V=v*G*a$, where v is the random number, G is the generator, and a is a constant.

In an embodiment, the ps is determined by the Witness node according to the following formula: $ps=(h+b)*x+v$, where h is the message digest, x is the private key, v is the random number, and b is a constant.

In an embodiment, the basic signature algorithm is one of an Elgmal signature algorithm and variants, or a Schnorr signature algorithm and variants, or a SM2 signature verification algorithm, or an ED25519 signature verification algorithm.

In an embodiment, the message hash algorithm is a cryptographically safe hash algorithm.

In an embodiment, the Leader node is a Witness node or a non-Witness node.

In accordance with another aspect of the present application, a pipeline-friendly signature method is provided, which is suitable for a Leader node, and includes the following steps: within a first appointment time, determining, according to a commit step of a Witness node, V corresponding to the Witness node, where the V is determined by the Witness node according to a random number and a generator, summing all the V to obtain C, and sending the C to the Witness node; within a second appointment time, receiving ps sent by the Witness node, where the ps is determined by the Witness node according to a public-private key pair generated by the Witness node and the C, determining, according to the ps received from the Witness node, whether a valid vote is taken by the Witness node, and determining N, where the N is a number of Witness nodes that valid votes are taken; and determining an aggregate signature when the N is greater than or equal to T, where s is a sum of N correct ps, and T is a threshold.

Within the first appointment time, if the Leader node does not receive the V sent by the Witness node, it is deemed that the corresponding Witness node has given up voting, and the Leader node randomly generates the V for the corresponding Witness node; if the Leader node receives the V sent by the Witness node, it is deemed that the corresponding Witness node participates in the voting; all the V are added to get the C, and the C is sent to the Witness node. Within the second appointment time, if the Leader node does not receive the ps sent by the corresponding Witness node, the corresponding Witness node is regarded as an invalid vote, and the corresponding marker bit of the bitmask Mask is marked as 0; verifying, by the Leader node, whether the received ps is correct; if the ps is incorrect, the corresponding Witness node is regarded as an invalid vote, and the corresponding marker bit of the bitmask Mask is marked as 0; if the ps is correct, the corresponding Witness node is regarded as a valid vote, and the corresponding marker bit of the bitmask Mask is marked as 1. An aggregate signature (C, s, Mask) is calculated, where s is the sum of N correct ps, and N is the number of Witness nodes having correct ps, which is used to be compared with the threshold T during the verification.

In an embodiment, the step of determining, according to the commit step of the Witness node, the V corresponding to the Witness node, also includes: determining that a corresponding Witness node has given up voting, and randomly generating, by the Leader node, the V for the corresponding Witness node, in case that the V sent by the Witness node is not received by the Leader node; and determining that the corresponding Witness node is participated in voting, in case that the V sent by the Witness node is received by the Leader node.

In an embodiment, the step of determining, according to the ps received from the Witness node, whether a valid vote is taken by the Witness node, also includes: verifying, by the Leader node, whether the ps received from the Witness node is correct; determining that a valid vote is taken by the Witness node which sends the ps, when it is verified by the Leader node that the ps received from the Witness node is incorrect; and determining that an invalid vote is taken by the Witness node which sends the ps, when it is verified by the Leader node that the ps received from the Witness node is correct.

In an embodiment, before the step of determining, according to the ps received from the Witness node, whether a valid vote is taken by the Witness node, the method also includes a step of determining that an invalid vote is taken by the Witness node which sends the ps, in case that the ps sent by the Witness node is not received by the leader node.

In an embodiment, the method also includes the following steps: marking a marker bit corresponding to the Witness node as 0 in the bitmask Mask, in case that an invalid vote is taken by the Witness node, wherein the bitmask Mask includes a plurality of marker bits, each Witness node has a corresponding marker bit in the bitmask Mask; and marking the marker bit corresponding to the Witness node as 1 in the bitmask Mask, in case that a valid vote is taken by the Witness node.

In an embodiment, the Leader node is a Witness node or a non-Witness node.

In accordance with yet another aspect of the present application, a signature verification method is provided, which is configured to verify an aggregate signature obtained according to the pipeline-friendly signature method described in any one of the above, and includes the following steps: acquiring an aggregate signature; determining, according to a bitmask, the Witness node having correct ps; determining that the signature verification is passed when a value obtained by $s*a*G$ is equal to a value obtained by $(h+b)*AggX+C$, and $N \geq T$; or determining that the signature verification is failed when the value obtained by $s*a*G$ is not equal to the value obtained by $(h+b)*AggX+C$, and/or $N<T$. Where s is a sum of N correct ps, N is a number of the Witness nodes having correct ps, T is a threshold, AggX is a sum of the public keys X of N Witness nodes having correct ps, C is a sum of the V of the Witness nodes having correct ps, a and b are constants, and the V is determined by the Witness node according to the random number and the generator.

In an embodiment, the step of determining, according to the bitmask, the Witness node having correct ps, also includes: determining a target marker bit that is marked as 1 in the bitmask; and determining that the Witness node corresponding to the target marker bit is the Witness node having correct ps.

In accordance with a further aspect of the present application, a device is provided, which includes: one or more processors; a memory for storing one or more programs, that, when executed by the one or more processors, causes the one or more processors to implement the method as described above.

In accordance with another aspect of the present application, a non-temporary storage medium is provided, in which a computer program is stored. When the computer program is executed by a processor, the method described in any of the above is implemented.

Compared with the existing technologies, the technical solution provided by the present application has the following beneficial effects:

The signature algorithm of the linear signature verification structure is constructed as an aggregate signature, which has a characteristic of threshold signatures. Being friendly to the pipeline mechanism avoids an interruption of the pipeline process due to a failure of a certain step of the agreement. The pressure of signature verification can be significantly reduced.

DETAILED DESCRIPTION OF EMBODIMENTS

To understand solutions of the present application more clearly, the present application will be described in detail with reference to the drawings and embodiments.

The present application will be further described in detail below with reference to the drawings and embodiments. It can be understood that the embodiments described here are only used to explain the related inventions, and are not intended to limit the present application. In addition, it should also be noted that, for ease of description, only the parts related to the inventions are shown in the drawings. The terms first and second mentioned in the present application are provided for convenience of describing the technical solutions of the present application, and do not have a specific limiting effect. These terms are general references and do not constitute a limiting effect on the technical solutions of the present application. It should be noted that in this application, the embodiments and the features in the embodiments can be combined with each other in an absence of conflict. Hereinafter, the present application will be described in detail with reference to the drawings and in conjunction with the embodiments.

Figure 4:
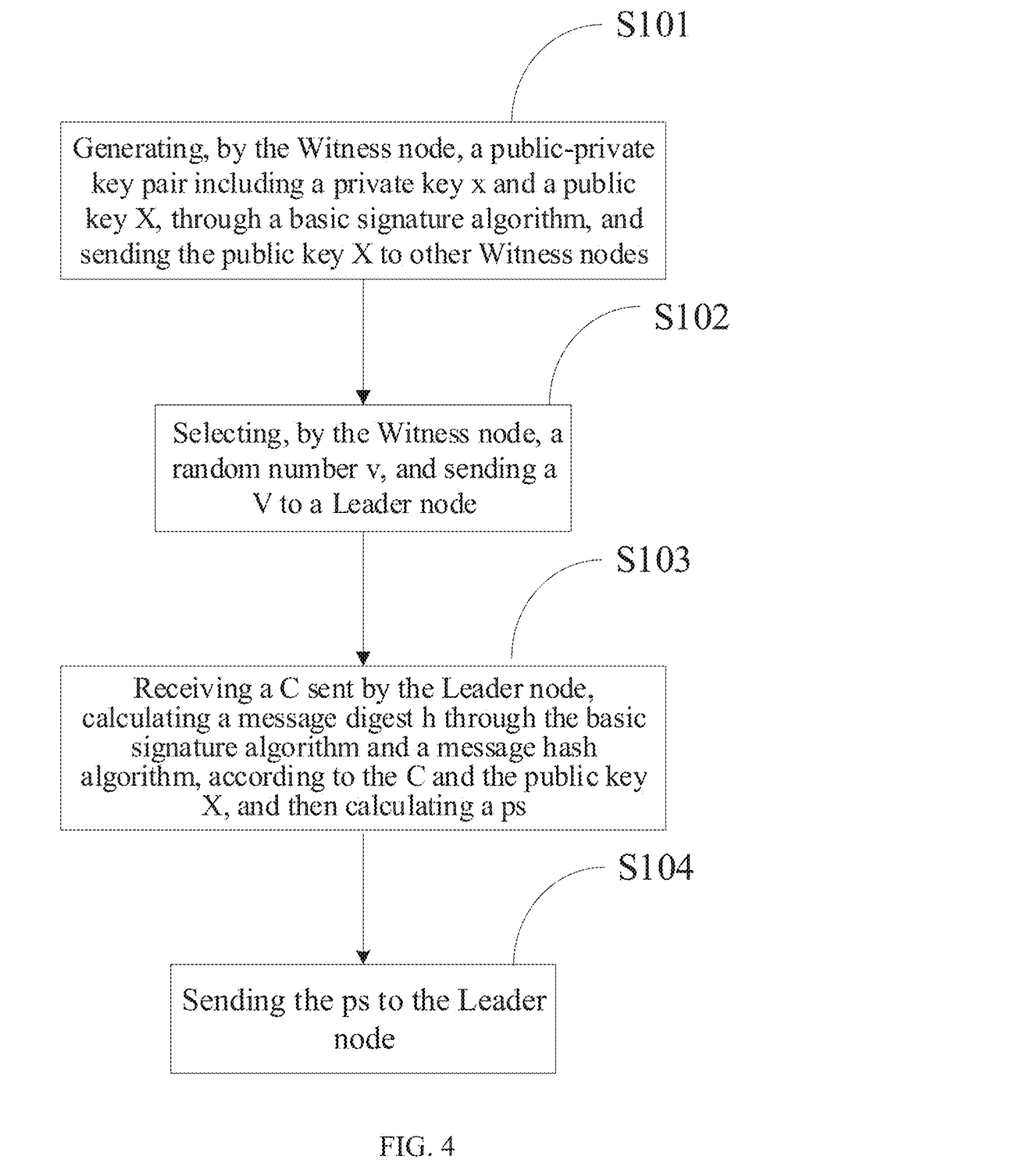
FIG. 4 is another flowchart of a pipeline-friendly signature method in accordance with an embodiment of the present application.

In accordance with an embodiment of the present application, a pipeline-friendly signature method is provided, which is suitable for the Witness node, as shown in FIG. 4, the method includes the following steps of S101-S104. In S101, the Witness node generates a public-private key pair including a private key x and a public key X, through a basic signature algorithm, and sends the public key X to other Witness nodes. In S102, the Witness node selects a random number v, and sends V to the Leader node. In S103, C is received from a Leader node, and a message digest h is calculated according to the C and the public key X, through the basic signature algorithm and a message hash algorithm, and then ps is calculated. In S104, the ps is sent to the Leader node.

Among them, $V=v*G*a$; $ps=(h+b)*x+v$. The Leader node is selected by more than one Witness nodes, and relevant parameters including at least a generator G is determined according to the type of the basic signature algorithm. Within a first appointment time, if the Leader node does not receive the V sent by the Witness node, it is deemed that the corresponding Witness node has given up voting, and the Leader node randomly generates V for the corresponding Witness node; if the Leader node receives the V sent by the Witness node, it is deemed that the corresponding Witness node participating in the voting; all the V is summed and added to get C, and then the C is sent to the Witness node. Within a second appointment time, if the Leader node does not receive the ps sent by the corresponding Witness node, the corresponding Witness node is regarded as an invalid vote, and the corresponding marker bit of the bitmask Mask is marked as 0; the leader node verifies whether the received ps is correct; if the ps is incorrect, the corresponding Witness node is regarded as an invalid vote, the corresponding marker bit of the bitmask Mask is marked as 0; if the ps is correct, the corresponding Witness node is regarded as a valid vote, and the corresponding marker bit of the bitmask Mask is marked as 1. An aggregate signature (C, s, Mask) is calculated to compare the size with a threshold T during verification, where s is the sum of N correct ps, N is the number of Witness nodes having correct ps.

In an optional implementation, the basic signature algorithm is one of the Elgmal signature algorithm and its variants, or the Schnorr signature algorithm and its variants, or the SM2 signature verification algorithm, or the ED25519 signature verification algorithm. In an optional implementation, the message hash algorithm is a cryptographically secure hash algorithm, such as SHA512, SM3, or SHA256. In an optional implementation, the Leader node is a Witness node or a non-Witness node. As an optional implementation, two Witness nodes exchange the public key X and send the exchanged public keys X to the Leader node to calculate AggX. AggX is the sum of the public keys X of N Witness nodes having ps correct. AggX acts as a public key when verifying aggregated signatures. In an optional implementation, the Leader node verifies whether the received ps is correct also includes: the Leader node judges whether the value obtained by $ps*G$ is equal to the value obtained by $h*X+V$, and if equal, the ps is correct; if not equal, then the ps is incorrect.

In an optional implementation, the message hash algorithm is a cryptographically secure hash algorithm. In an optional implementation, the Leader node is a Witness node or a non-Witness node. In this embodiment, an improved pipeline-friendly threshold signature method is provided, which can construct the signature algorithm having the linear signature verification structure as an aggregate signature, have the characteristic of threshold signatures, be friendly to the pipeline mechanism, avoid an interruption of the pipeline process due to the failure of a certain step of the agreement, and significantly reduce the pressure of signature verification.

Figure 5:
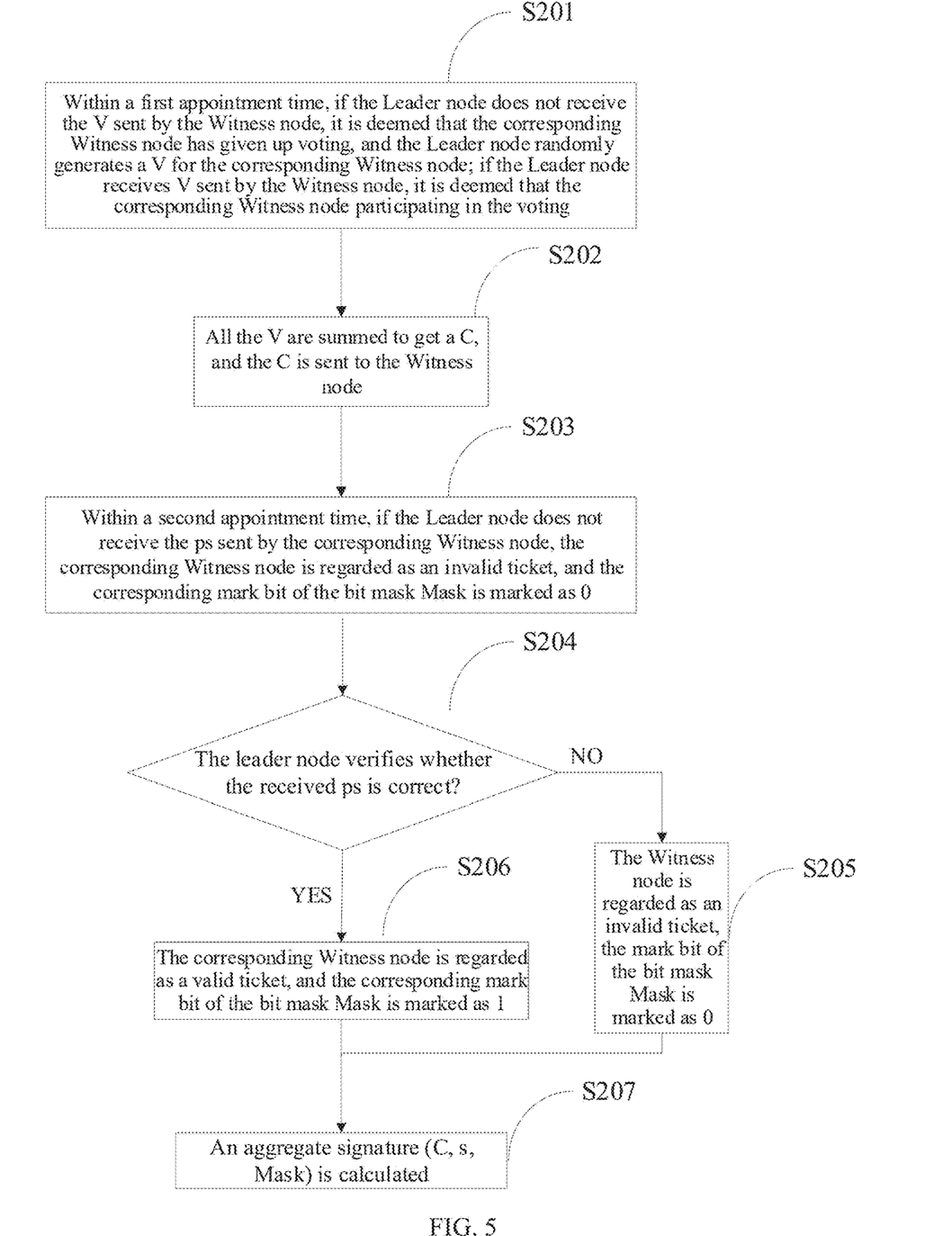
FIG. 5 is a flowchart of a pipeline-friendly signature method according to another embodiment of the present application.

In addition, in this disclosure, it is also provided a pipeline-friendly signature method, which is suitable for a Leader node, as shown in FIG. 5. the method includes the following steps of S201-S207. In S201, within the first appointment time, if the Leader node does not receive the V sent by the Witness node, it is deemed that the corresponding Witness node has given up voting, and the Leader node randomly generates V for the corresponding Witness node; if the Leader node receives the V sent by the Witness node, it is deemed that the corresponding Witness node participating in the voting. In S202, all the V is summed to get C, and then the C is sent to the Witness node. In S203, within the second appointment time, if the Leader node does not receive the ps sent by the corresponding Witness node, the corresponding Witness node is regarded as an invalid vote, and the corresponding marker bit of the bitmask Mask is marked as 0. In S204, the leader node verifies whether the received ps is correct. If the ps is incorrect, perform a step of S205. In S205, the corresponding Witness node is regarded as an invalid vote, the corresponding marker bit of the bitmask Mask is marked as 0. If the ps is correct, then perform a step of S206. In S206, the corresponding Witness node is regarded as a valid vote, and the corresponding marker bit of the bitmask Mask is marked as 1. In S207, an aggregate signature (C, s, Mask) is calculated, where s is the sum of N correct ps, N is the number of Witness nodes having correct ps, which is used to be compared with a threshold T during a verification.

In an optional implementation, the Leader node is a Witness node or a non-Witness node.

Figure 6:
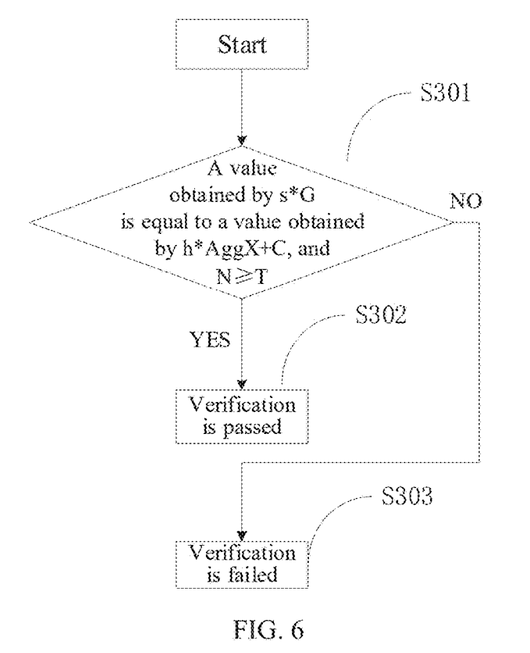
FIG. 6 is a flowchart of a signature verification method in accordance with an embodiment of the present application.

Finally, in this disclosure, it is also provided a signature verification method, as shown in FIG. 6, according to any one of the above pipeline-friendly signature method, including the following steps of S301-S303. In S301, if a value obtained by s*a*G is equal to a value obtained by (h+b)*AggX+C, and N≥T; then a step of S302 is performed, in which, the verification is passed; otherwise, a step of S303 is performed in which the verification is failed; where s is the sum of N correct ps, N is the number of the Witness node having correct ps, T is the threshold; AggX is the sum of the public keys X of the Witness nodes having correct ps; C is the sum of the V of the Witness nodes having the correct ps; V=v*G*a. N can be obtained by counting the number of 1 occurred at the marker bit of the bitmask Mask.

In accordance with an aspect of the present application, it is provided an improved pipeline-friendly threshold signature method, which is applied to blockchain network technology, and includes: constructing a signature algorithm having a linear signature verification structure as an aggregate signature, which has the characteristic of threshold signatures; being friendly to the pipeline mechanism of HotStuff, which avoids an interruption of HotStuff pipeline process due to the failure of a certain step of the agreement; and being able to significantly reduce the performance pressure of the verification service, which improves a processing speed of the verification.

In an optional implementation, constructing the signature algorithm having the linear signature verification structure as an aggregate signature, and the signature process is completed with the following steps:

S1: In an initial phase, firstly, it is required to select a Leader (abbreviation of Leader node, the same below) by a number of signers whose identities are called Witness (abbreviation of Witness node, the same below). The Leader may be one of the Witnesses, and also may not be one of the Witnesses. A Witness can also be a Leader at the same time.

Figure 3:
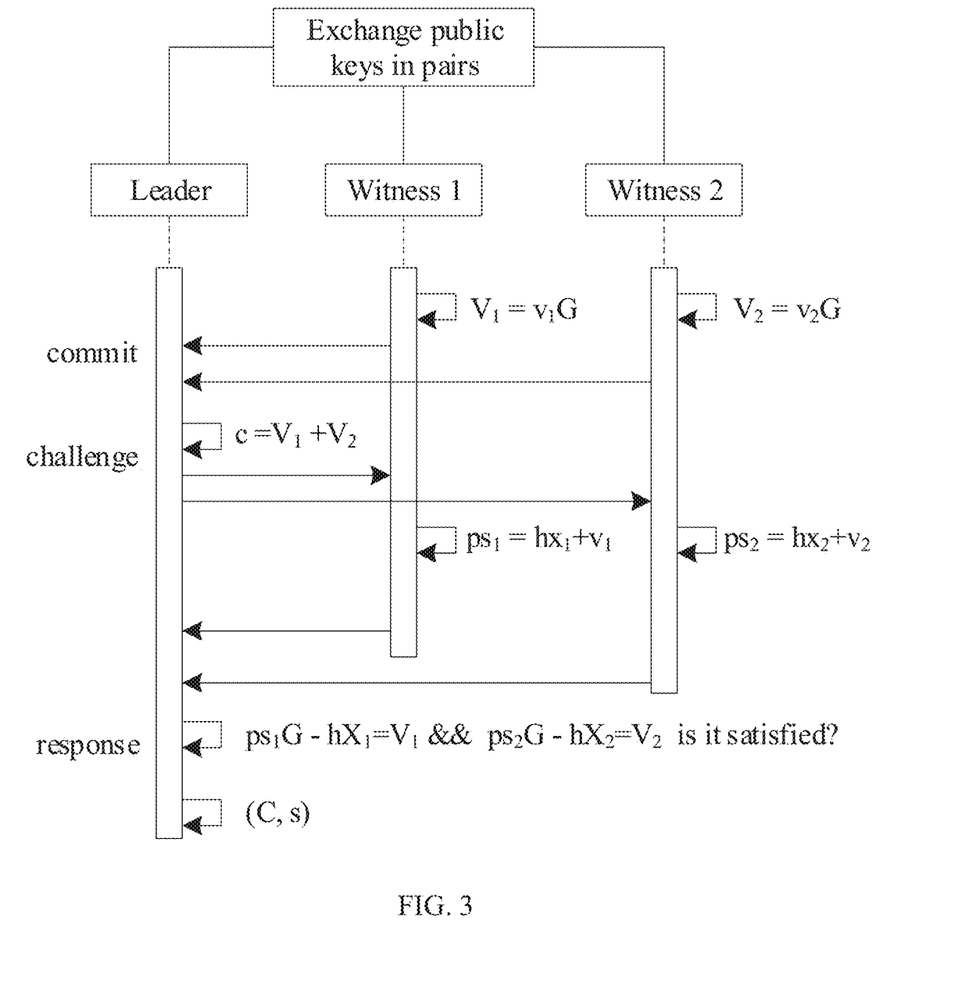
FIG. 3 is a flowchart of a pipeline-friendly signature method in accordance with an embodiment of the present application.

S2: All participants select the basic signature algorithm and the negotiated message hash algorithm. The basic signature algorithm may be the Elgmal signature algorithm or any variant of the algorithm, such as the ED25519 signature algorithm or the Schnorr signature algorithm, etc. Relevant parameters of this algorithm should have a cyclic group as a public parameter, referred to as a generator G;

S3: All Witnesses generate public and private key pairs x and X of the algorithm, and exchange public keys X with each other, as shown in FIG. 3, exchange public keys in pairs. The Leader calculates AggX, AggX is the sum of the public keys X of N Witness nodes having correct ps;

S4: In a signing phase, each Witness selects a random number v, calculates V=v*G*a, where v*G represents a product of v and G, and sends the V to the Leader;

S5: Leader calculates the sum of all V, that is C, and sends the C back to all Witnesses, as shown in FIG. 3;

S6: Witness calculates the partial signature ps after receiving the C. The specific method for calculation depends on the selected basic signature algorithm, such as ED25519. First, calculating the message digest h by using the C, X, the message to be signed and the jointly selected message digest algorithm, and then calculating ps=(h+b)*x+v and sending the ps to the Leader;

S7: Leader calculates a final aggregate signature (C, s) according to the received ps, where s is the sum of the ps.

In an optional implementation, the characteristic of threshold signatures may also be included. In a signature process with N Witnesses at one time, if the threshold is set as T (T≤N), then the Leader can generate a legal aggregated signature that is successfully verified only when partial signatures of N Witness are received. In an optional implementation, the characteristic of being pipeline-friendly may also be included, and the specific manifestation is that if an error occurs in any step of the agreement, the final step can always be reached without a need to re-execute the agreement from the beginning, to generate a legal or illegal signature. In an optional implementation, an efficient verification method may also be included. For the aggregated signature that is aggregated from the partial signatures of N Witnesses, the verification can be completed with only one check, which is N times more efficient than the selected basic signature algorithm. The specific verification method depends on which basic signature algorithm is selected.

Figure 2:
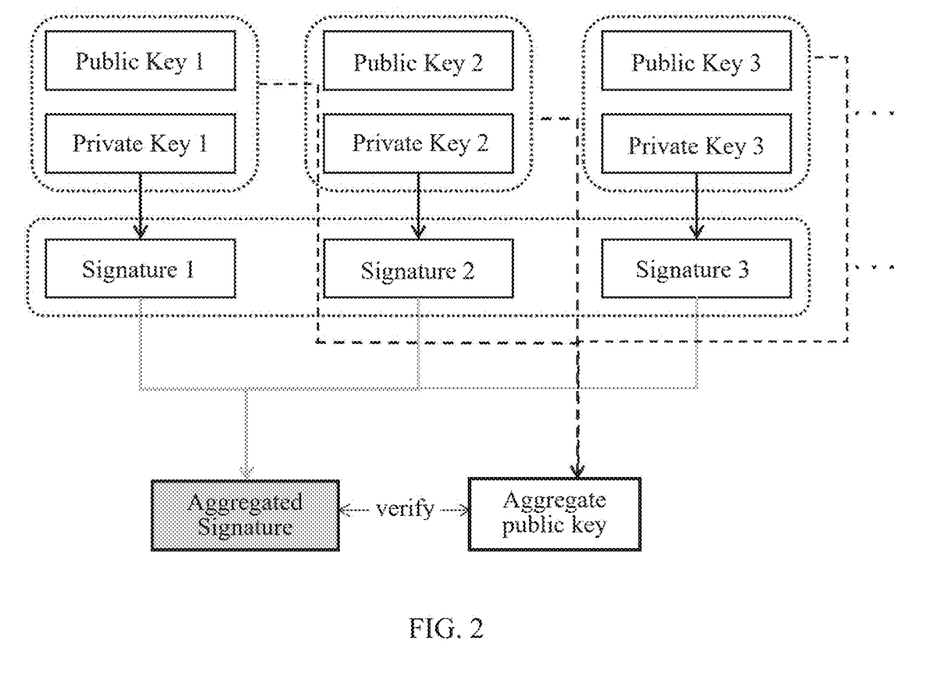
FIG. 2 is a diagram of the relationship between roles and keys in a pipeline-friendly signature method in accordance with an embodiment of the present application.

With reference to FIGS. 2 and 3, Witness1 and Witness2 are any two of the Witness nodes. In another optional implementation, two roles are provided, namely, Leader and Witness. In this embodiment, it may be assumed that the Ed25519 signature method is the selected basic signature algorithm, but this embodiment is not limited to this selection, and any variant with the Elgmal signature algorithm can be used as the selected basic algorithm.

First, each participant generates a public-private key pair ed25519, the private key is denoted as x, the public key is denoted as X, and the relationship X=x*G is satisfied. Participants exchange public keys with each other and need to ensure that the public key comes from the holder having the corresponding private key. For example, a signature may be provided for completing a proof. Because anyone owns the public key of other people, anyone can calculate the aggregate public key AggX, which is the sum of all X.

In an optional implementation, each Witness selects a random number v, calculates the corresponding V=v*G*a, and then transmits the V to the Leader. As shown in FIG. 3, Witness1 selects the random number v1, and calculates V1=v1*G*a; Witness2 selects the random number $v_2$, and calculates $V_2$=$v_2$*G*a. This step is called commit. In an optional implementation, the Leader node aggregates the V to obtain C, the C is the sum of all the V, and sends the C to the Witness, as shown in FIG. 3, C=$V_1$+$V_2$. This step is called challenge. In an optional implementation, the partial signature is calculated ps=(h+b)*x+v after the Witness obtains the C, as shown in FIG. 3, $ps_1$=(h+b)*x+$v_1$, $ps_2$=(h+b)*x+$v_2$, where h is the message digest value of the C and the message to be signed, etc. $ps_1$ and $ps_2$ is sent to the Leader. This step is called response. Finally, the $ps_1$ and $ps_2$ is summed by the Leader to obtain s, and then the signature (C, s) is obtained.

Figure 7:
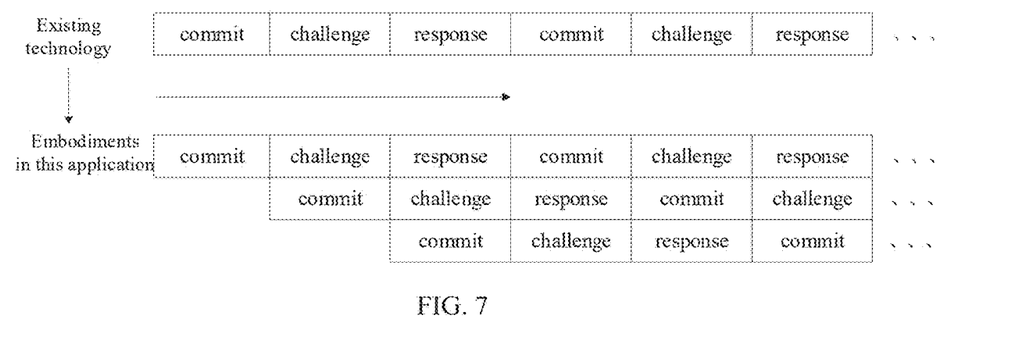
FIG. 7 is a schematic diagram showing a comparison of a pipeline-friendly signature method according to an embodiment of the present application and a signature method in the existing technologies.

As shown in FIG. 7, the commit is completed within the first appointment time, and the challenge is completed within the second appointment time. Even if several nodes do not respond, the signature process will be re-initiated if the first appointment time and the second appointment time are exceeded, respectively. Therefore, the signature method described in this disclosure is friendly to the pipeline mechanism compared with the existing one, and will not interrupt the pipeline process due to the failure of a certain step of the agreement, and significantly reduces the pressure of signature verification.

In accordance with an exemplary embodiment, a device is provided, which includes: one or more processors; a memory for storing one or more programs, and the one or more programs, when being executed by the one or more processors, causes the one or more processors to implement the method as above-described.

In accordance with an exemplary embodiment, a storage medium is provided, in which a computer program is stored, that, when executed by a processor, causes the processor to implement the method as above-described in Embodiment 1.

Figure 1:
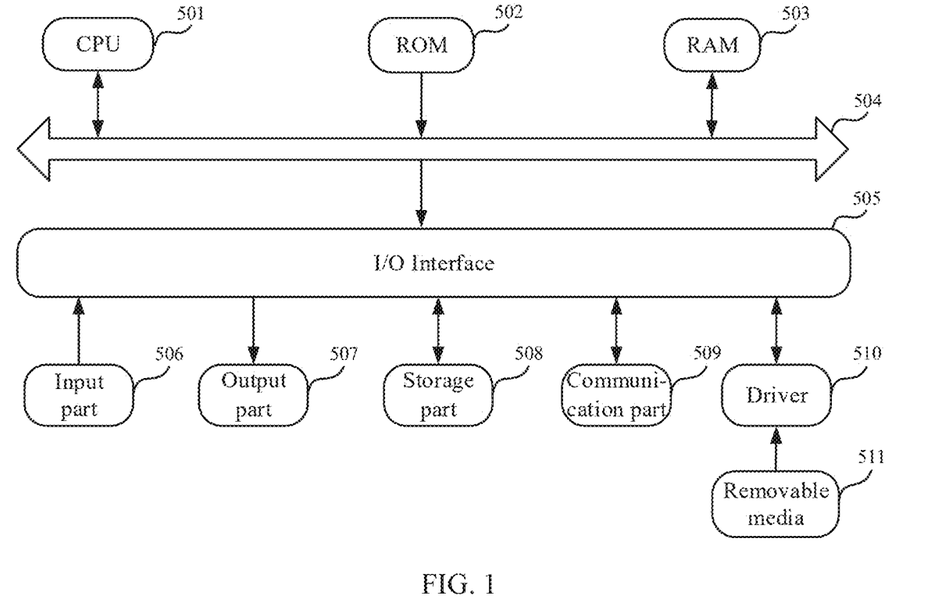
FIG. 1 is a schematic structural diagram of a device in accordance with the present application.

FIG. 1 is a schematic structural diagram of a device according to an embodiment of the present application.

As shown in FIG. 1, in accordance with another aspect of the present application, it is also provided a device 500. The device includes one or more central processing units (CPU) 501, which can execute various appropriate actions or operations according to the programs stored in a read-only memory (ROM) 502 or the program loaded from the storage part 508 into the random-access memory (RAM) 503. In the RAM 503, various programs and data required for operations of the device 500 are also stored. The CPU 501, ROM 502, and RAM 503 are connected to each other through a bus 504. An input/output (I/O) interface 505 is also connected to the bus 504.

The following components are connected to the I/O interface 505: an input part 506 including a keyboard, a mouse, etc.; an output part 507 including a cathode ray tube (CRT), a liquid crystal display (LCD) and a speaker etc.; a storage part 508 including a hard disk, etc.; and a communication part 509 including a network interface card such as a LAN card, a modem, and the like. The communication part 509 performs communication processing via a network such as the Internet. A driver 510 may also be connected to the I/O interface 505 based on actual needs. On the driver 510, a removable media 511, such as magnetic disks, optical disks, magneto-optical disks, semiconductor memory, etc., can be installed as needed, so that the computer program read from the removable media is installed into the storage part 508 as needed.

In particular, the method described in any of the above embodiments may be implemented as a computer software program. For example, the embodiments disclosed in the present application include a computer program product, which includes a computer program tangibly contained on a machine-readable medium, and the computer program includes program code for executing the method described in any of the foregoing embodiments. In such embodiments, the computer program may be downloaded and installed from the network through the communication part 509, and/or installed from the removable medium 511.

In accordance with yet another aspect of the present application, it is also provided a computer-readable storage medium. The computer-readable storage medium may be a computer-readable storage medium included in the device as described in the foregoing embodiment; or it may exist alone, be a computer-readable storage medium that is not built into the device. The computer-readable storage medium stores one or more programs, and the programs when executed by one or more processors, the methods described in the present application is implemented.

The flowcharts and block diagrams in the drawings illustrate the possible implementation architecture, functions, and operations of the system, method, and computer program product according to various embodiments of the present application. In this regard, each block in the flowchart or block diagram can represent a module, program segment, or part of code, and the module, program segment, or part of code contains one or more executable instructions for realizing the specified logic function. It should also be noted that, in some alternative implementations, the functions marked in the block may also occur in a different order from the order marked in the drawings. For example, two blocks shown one after another can actually be executed substantially in parallel, or sometimes can be executed in the reverse order, depending on the functions involved. It should also be noted that each block in the block diagram and/or flowchart, and the combination of the blocks in the block diagram and/or flowchart, may be implemented by a dedicated hardware-based system that performs the specified functions or operations or may be implemented by a combination of dedicated hardware and computer instructions.

The units or modules involved in the embodiments described in the present application can be implemented in software or hardware. The described units or modules may also be arranged in the processor. For example, each of the described units may be a software program arranged in a computer or a mobile smart device, or may be a separately configured hardware device. Among them, the terms for these units or modules do not constitute a limitation on the units or modules themselves under certain circumstances.

The above descriptions are only some preferred embodiments of the present application and provide an explanation of the applied technical principles. It should be understood that for those skilled in the art, the scope of the present application is not limited to the technical solutions formed by the specific combination of the above technical features, and should also cover other technical solutions formed by arbitrarily combining the above technical features or the equivalent features without departing from the concept of this application. For example, a technical solution formed by substituting the above features with technical features having similar functions disclosed (but not limited to) in this application.

What is claimed is:

1. A pipeline-friendly signature method, comprising:
generating, by a Witness node, a public-private key pair including a private key and a public key, through a basic signature algorithm, and sending the public key to other Witness nodes;
selecting, by the Witness node, a random number;
determining, by the Witness node, an intermediate parameter, denoted as "V", according to the random number and a generator, and sending the V to a Leader node, wherein the generator is a relevant parameter determined according to a type of the basic signature algorithm;
receiving, by the Witness node, a challenge parameter, denoted as "C", sent by the Leader node, wherein the C is obtained by the Leader node according to the V received by the Leader node;
determining, by the Witness node, a message digest according to the C and the public key, through the basic signature algorithm and a message hash algorithm; and
determining, by the Witness node, a partial signature, denoted as "ps", according to the message digest and the random number; and sending the ps to the Leader node.

2. The pipeline-friendly signature method according to claim 1, wherein the V is determined by the Witness node according to the following formula:

$$V = v*G*A$$

wherein, v is the random number, G is the generator, and a is a constant.

3. The pipeline-friendly signature method according to claim 1, wherein the ps is determined by the Witness node according to the following formula:

$$ps = (h+b)*x+v$$

wherein, h is the message digest, x is the private key, v is the random number, and b is a constant.

4. The pipeline-friendly signature method according to claim 1, further comprising:
within a first appointment time,
determining that a corresponding Witness node has given up voting in case that the V sent by the Witness node is not received by the Leader node, and randomly generating, by the Leader node, a V for the corresponding Witness node; and
determining that the corresponding Witness node is participated in voting in case that the V sent by the Witness node is received by the Leader node; and
summing, by the Leader node, all the V to obtain the C, and sending the C to the Witness node;
within a second appointment time,
receiving, by the Leader node, the ps sent by the Witness node;
determining, by the Leader node, according to the ps received from the Witness node, whether a valid vote is taken by the Witness node;
determining, by the Leader node, N, wherein the N is a number of Witness nodes where valid votes are taken; and
determining, by the Leader node, an aggregate signature when the N is greater than or equal to T, wherein s is a sum of N correct ps, and T is a threshold.

5. The pipeline-friendly signature method according to claim 4, wherein the determining, by the Leader node, according to the ps received from the Witness node, whether the valid vote is taken by the Witness node, comprises:
verifying, by the Leader node, whether the ps received from the Witness node is correct;
determining that a valid vote is taken by the Witness node which sends the ps, when it is verified by the Leader node that the ps received from the Witness node is incorrect; and
determining that an invalid vote is taken by the Witness node which sends the ps, when it is verified by the Leader node that the ps received from the Witness node is correct.

6. The pipeline-friendly signature method according to claim 4, wherein before determining, by the Leader node, according to the ps received from the Witness node, whether the valid vote is taken by the Witness node, the method further comprises:
determining that an invalid vote is taken by the Witness node which sends the ps, in case that the ps sent by the Witness node is not received by the leader node.

7. The pipeline-friendly signature method according to claim 6, wherein the method further comprises:
marking, by the Leader node, a marker bit corresponding to the Witness node as 0 in a bitmask, in case that an invalid vote is taken by the Witness node, wherein the bitmask includes a plurality of marker bits, each Witness node has a corresponding marker bit in the bitmask; and
marking, by the Leader node, the marker bit corresponding to the Witness node as 1 in the bitmask, in case that a valid vote is taken by the Witness node.

8. The pipeline-friendly signature method according to claim 4, wherein before determining, by the Leader node, according to the ps received from the Witness node, whether the valid vote is taken by the Witness node, the method further comprises:
determining that an invalid vote is taken by the Witness node which sends the ps, in case that the ps sent by the Witness node is not received by the leader node.

9. The pipeline-friendly signature method according to claim 8, wherein the method further comprises:
marking, by the Leader node, a marker bit corresponding to the Witness node as 0 in a bitmask, in case that an invalid vote is taken by the Witness node, wherein the bitmask includes a plurality of marker bits, each Witness node has a corresponding marker bit in the bitmask; and
marking, by the Leader node, the marker bit corresponding to the Witness node as 1 in the bitmask, in case that a valid vote is taken by the Witness node.

10. The pipeline-friendly signature method according to claim 5, wherein before determining, by the Leader node, according to the ps received from the Witness node, whether the valid vote is taken by the Witness node, the method further comprises:
determining that an invalid vote is taken by the Witness node which sends the ps, in case that the ps sent by the Witness node is not received by the leader node.

11. The pipeline-friendly signature method according to claim 10, wherein the method further comprises:
marking, by the Leader node, a marker bit corresponding to the Witness node as 0 in a bitmask, in case that an invalid vote is taken by the Witness node, wherein the bitmask includes a plurality of marker bits, each Witness node has a corresponding marker bit in the bitmask; and
marking, by the Leader node, the marker bit corresponding to the Witness node as 1 in the bitmask, in case that a valid vote is taken by the Witness node.

12. A signature verification method, configured to verify an aggregate signature obtained through the pipeline-friendly signature method according to claim 1, and comprising:
acquiring an aggregate signature;
determining, according to a bitmask, a Witness node that has sent a correct ps;
determining that a signature verification is passed when a value obtained by s*a*G is equal to a value obtained by (h+b)*AggX+C, and N≥T; or determining that the signature verification is failed when the value obtained by s*a*G is not equal to the value obtained by (h+b)*AggX+C, and/or N<T;
wherein s is a sum of N correct ps, N is a number of Witness nodes that have sent the correct ps, T is a threshold, AggX is a sum of public keys X of N Witness nodes that have sent the correct ps, and the C is a sum of the V of the N Witness nodes that have sent the correct ps, a and b are constants, G is the generator, and h is the message digest.

13. The signature verification method according to claim 12, wherein the determining, according to the bitmask, the Witness node that has sent the correct ps, comprises:
determining a target marker bit that is marked as 1 in the bitmask; and
determining that the Witness node corresponding to the target marker bit is the Witness node that has sent the correct ps.

14. A device, comprising:
at least one processor; and
a memory, configured to store at least one computer program, that, when executed by the at least one processor, cause the at least one processor to implement the method according to claim 1.

15. A non-transitory computer readable storage medium storing a computer program, that, when executed by a processor, causes the processor to implement the method according to claim 1.

* * * * *